A. RIESTER.
AGRICULTURAL IMPLEMENT.
APPLICATION FILED SEPT. 22, 1909.
987,171.
Patented Mar. 21, 1911.
2 SHEETS—SHEET 1.
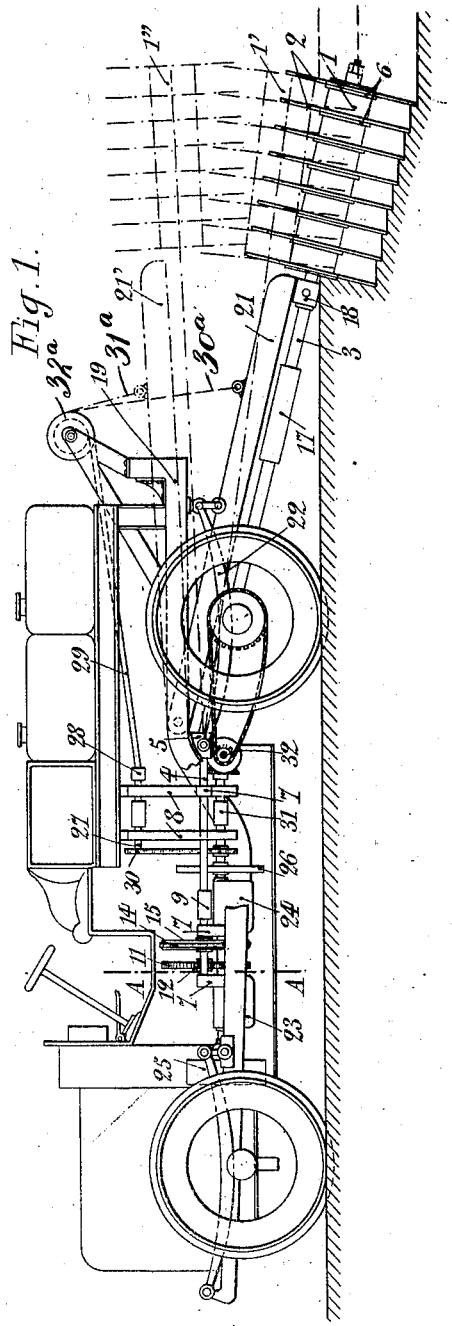
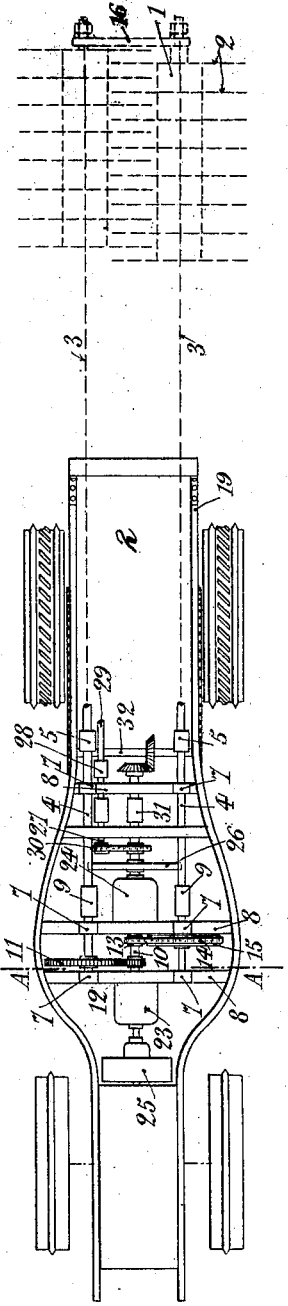
Witnesses:
Clara Burger
Clarissa Franck
Inventor:
André Riester
by his Attorney A. RIESTER.
AGRICULTURAL IMPLEMENT.
APPLICATION FILED SEPT. 22, 1909.
987,171.
Patented Mar. 21, 1911.
2 SHEETS—SHEET 2.
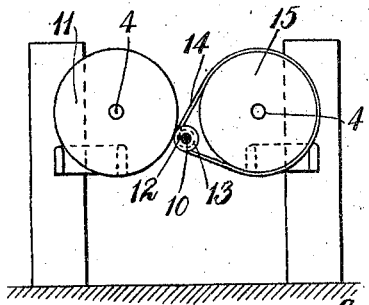
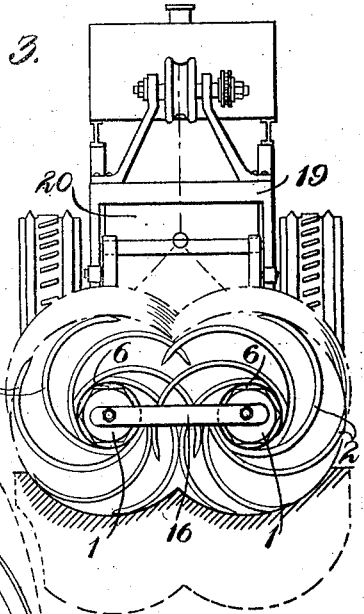
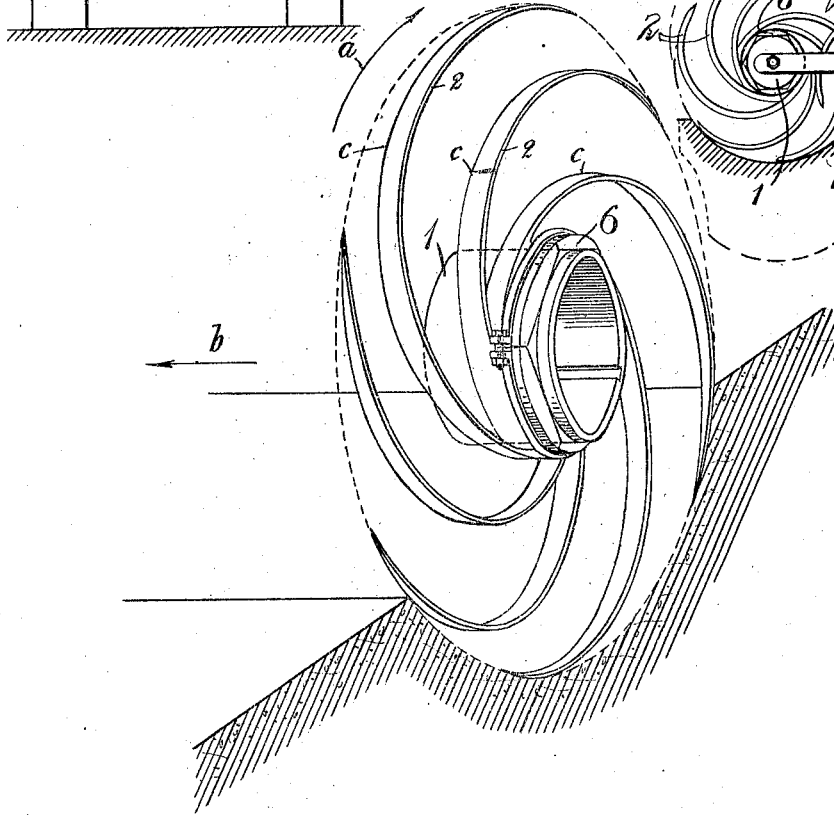
Witnesses:
Claussa Franck
Edw. S. Dubois.
Inventor
André Riester
by
his Attorneys

UNITED STATES PATENT OFFICE.

ANDRÉ RIESTER, OF PARIS, FRANCE.

AGRICULTURAL IMPLEMENT.

987,171.  Specification of Letters Patent.  Patented Mar. 21, 1911.

Application filed September 22, 1909. Serial No. 518,987.

*To all whom it may concern:*

Be it known that I, ANDRÉ RIESTER, citizen of the Republic of France, residing at 34 Rue de la Faisanderie, Paris, France, have invented new and useful Improvements in Agricultural Implements, of which the following is a specification.

The present invention relates to a novel form of rotary agricultural implement, in the nature of a plow or digging implement, designed to be used in connection with motor driven plows.

The invention, in its preferred form, consists essentially of one or more pairs of rotary metallic bodies, preferably in the form of elongated cylinders adapted to be inclined to the horizontal whereby a progressive digging action, during operation, is produced, each of the bodies constituting a supporting shaft for a series of curved prongs or blades which form the digging implements proper. The shafts are coupled in pairs by yokes or their equivalents and as they rotate reversely to each other, the reaction of the soil is thus balanced or compensated for. The prongs are so constructed and arranged that the clods or layers of soil cut thereby are thrown by the prongs laterally to a distance dependent upon the formation of the latter.

In the form of invention shown, the prongs which are all turned on a curve of the same radius, are arranged equidistantly on the shafts, the arrangement being such that the prongs of adjacent shafts alternate, whereby the prongs of one shaft operate between the prongs of the companion shaft, thus producing, during operation, a harrowing or substantially pulverizing action on the soil. As stated the prongs are curved in the arc of a circle, so that the series or group of prongs on any shaft acts not only in the nature of a rake but also as a receptacle for raising and throwing up the loosened soil.

The invention is illustrated in the accompanying drawings, wherein—

Figure 1 is a side elevational view of a motor plow showing my improved implement attached thereto; Fig. 2 is a top plan view thereof; Fig. 3 is a rear elevational view thereof showing the implement in operative position; Fig. 4 is a vertical sectional view taken on the line A—A in Figs. 1 and 2; and Fig. 5 is a perspective view illustrative of the manner in which the prongs are mounted on the shaft.

Referring to the drawing 1 designates a pair of elongated cylindrical shafts each provided with a series of prongs or blades 2 of the same radius, and owing to the horizontal inclination of the structure, when in operation, a progressive digging action results. The axis of the implement not being the same as that of the plow itself, it follows that the digging action takes place outside the tracks of the plow wheels.

3 designates the intermediate connecting shafts, which are attached to the motor shafts 4 by means of universal joints 5 which transmit the rotary motion of the shaft 4 in all positions.

The group of prongs 2 is fixed on bosses 6 which are secured to the shafts 1 by any suitable means.

The preferred form of the prongs is that shown in Figs. 3 and 5, and the great advantage of this form is found in the fact that owing to the large curve which they describe they act as picks, then cut and loosen the soil and shear it at the same time that it is being thrown outwardly.

In Fig. 1, the implement is shown in three positions:—viz. in full lines in its inclined position deep in the earth; position 1' where it is acting on the surface of the earth; and position 1" where it is in inoperative position during passage of the plow over roads.

Upon reference to Fig. 5 it will be noted that the prongs partake of the nature of a group of scarifiers; during their rotary movement in the direction of arrow $a$ they perform the work of scarifiers, that is they have the required flexibility to clear, without breaking such obstacles as stones which they may encounter. Moreover they act as picks, and by reason of their great curvature they immediately elevate the soil after the manner of a ladle or shovel but differently from the blades of scarifiers, because by reason of the combined double movement of rotation and advance, they cut the earth like shears with their sharp lateral edges $c$ directly forwardly, *i. e.* in the direction of movement of the vehicle (arrow $b$). The structure of the prongs as shown and described is such that they easily overcome the resistance offered by the soil and hence the power of the motor is well utilized, and owing to the fact that the prongs on one shaft rotate between the prongs on the other the earth is raked over.

The shafts 4 are carried in roller bearings 7 fixed to the supports 8 carrying clutches 9, and are driven by the motor shaft 10, one of the shafts 4 being driven by means of gear wheels 11 and 12 and the other by pinion 13 and chain 14, whereby the two shafts revolve reversely, causing reverse rotation of the shafts 1 carrying the prongs 2. The shafts 4 are kept spaced apart by their bearings in the supports 8 and the yoke 16 connects the rear ends of shafts 1 of a pair of implements.

The connecting shafts 3 are provided with sleeves 17 (to connect the bipart shafts) and with bearings and trunnions at 18; the up and down motion of these shafts being controlled by chains 30$^a$ and 31$^a$ (Fig. 1) passing to a winch 32$^a$ which is operated directly from the motor. The chassis 19 is suspended on springs 22 and the rear part thereof is in the form of an inverted U, so that the supporting member 21, for the shafts 3, may be raised in the space 20 from its lowered position to the position 21' (Fig. 1).

23 and 24 indicate gear boxes of which one is directly connected, so that the motor and directly connected implement may operate at high speed; the driving wheels having four speeds and the implements two speeds.

The motor friction clutch is designated 25; the brake is designated 26; 27 is a shaft driven from shaft 10 by gearing 30, said shaft 27 being connected by a universal joint 28 to the shaft 29 designed to drive the winch 32$^a$; 31 and 32 are the usual connections between the motor and the driving wheels of the vehicle.

Having now described my invention what I claim as new and desire to secure by Letters Patent is:—

1. In an agricultural implement, the combination with a pair of supporting shafts, of a plurality of prong like members thereon, the members on one shaft entering between the members on the adjacent shaft, all of said members being curved in the arc of a circle and having the same radius, and each of said members having a cutting edge directed in the line of advance of the implement.

2. In combination, a pair of supporting shafts, a plurality of prong like members on each thereof, the members on one shaft entering between the members on the adjacent shaft, and means for connecting said shafts as a unitary structure.

3. In combination, a pair of supporting shafts, means whereby said shafts may be horizontally inclined, a plurality of prong like members on each shaft, the members on one shaft entering between the members on the adjacent shaft, and means for uniting said shafts as a unitary structure.

4. In combination, a pair of cylindrical supporting shafts, a plurality of curved prong like members of the same radius spaced about each shaft, the members on one shaft entering between the members on the adjacent shaft, means for horizontally inclining said shafts, and means for uniting adjacent shafts as a unitary structure.

5. In combination, a pair of cylindrical supporting shafts, means for rotating said shafts reversely to each other, a plurality of prong like members on each shaft, the members on one shaft entering between the members on the adjacent shaft, means for horizontally inclining said shafts, and means for uniting said shafts as a unitary structure.

In testimony whereof I have signed my name to this specification in the presence of two subscribing witnesses.

ANDRÉ RIESTER.

Witnesses:
 LOUIS FAUTRAT,
 H. C. COXE.